March 28, 1950 H. B. BABSON 2,502,363
GASKET FOR MILKERS
Filed Oct. 31, 1945
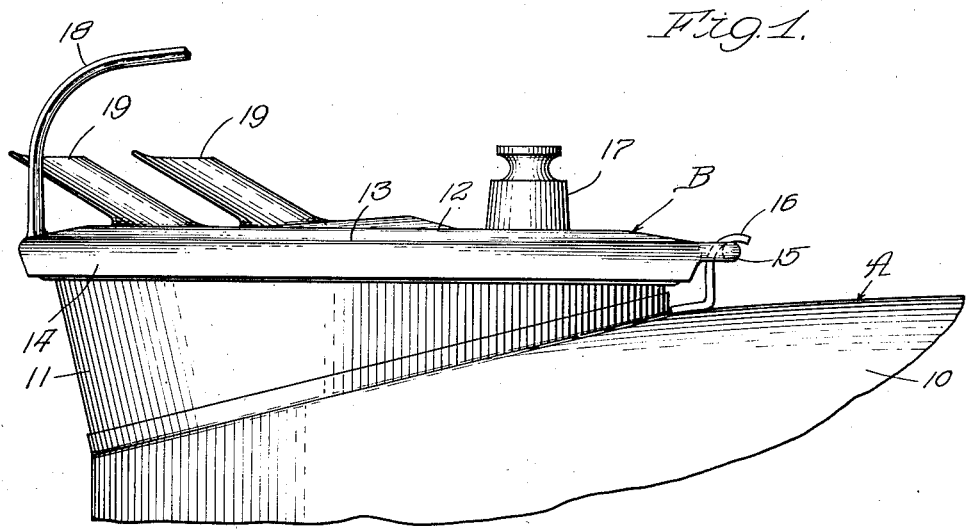
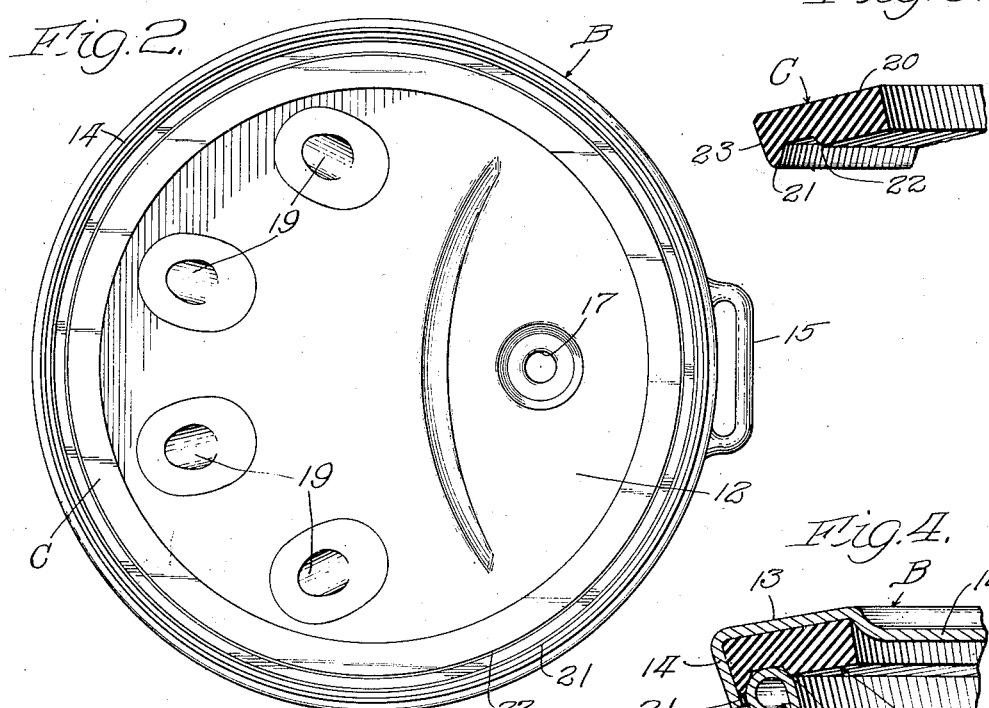
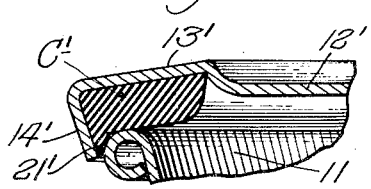
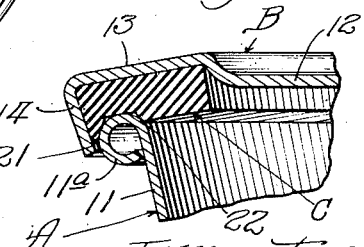
Inventor:
Henry B. Babson,
By Chitton, Wiles, Schroeder,
Merriam & Hofgren, Attys.

Patented Mar. 28, 1950

2,502,363

UNITED STATES PATENT OFFICE 2,502,363

GASKET FOR MILKERS

Henry B. Babson, Chicago, Ill., assignor to Babson Bros. Co., a corporation of Illinois Application October 31, 1945, Serial No. 625,713

2 Claims. (Cl. 220—46)

This invention relates to a gasket for milkers, and more particularly to a gasket which is particularly advantageous for use in sealing the lid to the bucket in a suspended milker.

The pail or bucket of a milker generally comprises a vessel adapted to receive at least 40 or 50 pounds of milk, with a relatively large opening in the top adapted to be closed by a lid which usually carries the pulsator and the connector nipples adapted to be connected to the tubes leading to the teat cups, another set of connections being made from the teat cup shells to the pulsator automatically to effect intermittent evacuating of the shells. The lid has to be sealed to the rim of the milker opening during the milking operation in order to maintain a vacuum within the bucket and in the inflations, and a gasket is usually placed between the lid and rim for this purpose.

In order to enable the convenient and proper sterilization of parts which is necessary to maintenance of a milker, the gasket cannot be permanently mounted on either the bucket or lid, but must be readily removable in order to enable it to be thoroughly scrubbed and sterilized, as with a chlorine solution, at the end of each milking period. I have heretofore developed a lid and gasket combination, as shown in my Patent No. 1,653,756, issued December 27, 1927, which provided some holding action on the gasket when the lid was taken off the bucket merely to dump it, but which enabled the gasket to be conveniently removed and replaced in connection with sterilization of the milker. This gasket had several disadvantages, however, and the gasket arrangement here being disclosed and claimed is an improvement on that shown in my above-mentioned patent.

One of the disadvantages of the arrangement shown in my above-mentioned patent is that the inner edge of the annular gasket had to be forceably distorted up into operative position by the engagement of the outer edge of the gasket with the depending flange or rim of the lid; and when the gasket became old it had a bad tendency to sag away from the lid at its inner edge. Another difficulty with such gasket was that the vacuum in the bucket (generally in the neighborhood of 7 pounds per square inch during operation of the milker) had a tendency to pull in on any portion of the gasket which was not tightly mechanically gripped between the bucket rim and the lid, resulting in the gasket sucking in and frequently dropping to the bottom of the pail with complete loss of vacuum. This difficulty was accentuated and particularly disadvantageous where the lid or the rim of the bucket was slightly out of round or out of a true plane, because of "warping" of the metal, dropping of the bucket or the lid, or other causes.

The gasket which I am disclosing and claiming here overcomes these disadvantages and provides a good seal, even with lids or rims out of round or not in a true plane, by the provision of a depending flange portion at the outer edge of the annular gasket adapted to engage the outer edge of the rim of the bucket opening, and by an initial preforming of the gasket such that its body portion, instead of being in a plane when in unstressed condition, has its inner edge higher with respect to the outer edge of the annulus than when the gasket is in sealing position in the lid.

Other features and advantages of my invention will be apparent from the following specification and the drawings, in which:

Figure 1 is a fragmentary side elevational view of a suspended milker embodying my invention, with the pulsator and the various inflation tubes removed; Figure 2 is a bottom view of the lid shown in Figure 1; Figure 3 is a fragmentary cross sectional view of one form of improved gasket in initial or unstressed position; Figure 4 is a fragmentary transverse sectional view of the lid and gasket in place on the bucket rim; and Figure 5 is a view similar to Figure 4, but showing another form of gasket embodying my inventions.

The gasket with which I am here concerned is for the same purpose as that fully described and claimed in my above-mentioned Patent 1,653,756; and the particular form of milking machine partially illustrated in a suspended milker of the kind fully described in McCornack Patent 1,859,213, issued May 17, 1932, so that this specification will not be burdened with a complete description of the way in which a suspended milker is operated and of all its component parts. Reference may be made to either of the above-mentioned patents to supplement this specification in such regard if desired, and the description will hereafter be limited to the particular parts with which I am here concerned.

In the particular embodiment of my invention illustrated in Figures 1–4, the bucket is identified in general as A, the lid as B, and the gasket as C. The bucket comprises a main body portion 10 and a neck or riser portion 11 provided with a rim at its upper edge formed by turning the metal back in a "small round" 11a, this rim defining a circular opening. The lid B comprises a main body portion 12, an outer annular gasket seating portion 13 (best seen in Figure 4) at a slight angle to the general plane of the lid, as 10°, and an outer annular depending flange or rim portion 14. This depending flange portion of the lid extends downwardly and inwardly so as to extend in at an angle of perhaps 15° with a line normal to the plane of the main body portion of the lid. When the gasket C is placed in operative position in the lid, as shown in Figure 4, the coaction between this downwardly and inwardly extending flange and the outer edge of the gasket serves to keep the gasket in operative position in the lid when it is removed from the bucket for any reason, as fully explained in my aforementioned Patent 1,653,756, yet enables the gasket to be conveniently removed and replaced when desired. The lid also has certain other parts and portions associated with it, as the eyelet part 15 adapted to engage the hook 16 on the bucket, an upstanding member 17 adapted to support the pulsator, a handle 18, and connector nipples 19. Inasmuch as all of these parts are conventional and well known in milkers on the commercial market, and fully described in the above-mentioned patents, they will not be described further here.

The form of my improved gasket shown in Figures 3 and 4 comprises a main body portion 20 of annular form and generally rectangular in cross section, a depending flange portion 21 adapted to engage the outer edge of the bucket rim, and another depending portion 22 adapted to engage the inner edge of the rim. The gasket is of suitable resilient material, as synthetic rubber, and is molded or otherwise preformed so that in unstressed, or what might be termed "normal" condition, the inner edge of the upper surface of the body portion 20 is higher with respect to the outer edge than when it is in operative position in the lid. That is, the gasket is shown in what may be termed unstressed condition in Figure 3, with the upper surface of the main body portion at an angle of about 20° to the horizontal; whereas when the gasket is in place in the lid, as shown in Figure 4, this upper surface will lie at the lesser angle determined by the lid portion 13, as for example 10°. This initial preforming of the gasket gives its inner edge an upward stress or compression against the portion 13 of the lid which is dependent to a large extent upon the initial preforming of the gasket, and not wholly dependent upon the engagement of the lid flange 14 with the outer edge 23 of the gasket. Even when the gasket has softened up and aged somewhat the inner edge still hugs tightly to the lid, and does not tend to sag away from it.

The outer depending flange portion 21 of the gasket has its inner annularly disposed surface of a diameter such that it is adapted to engage the outer edge of the rim 11a of the bucket neck, as may be best seen in Figure 4; and the other angularly disposed surface of the other depending portion 22 is spaced from the portion 21 a little less than the diameter of the "small round" of the rim 11a, so that it tends to engage the inner edge of the rim in use as shown in Figure 4. The result is a seal which is not only very effective when all parts are in correct relationship to each other, but which is adapted to compensate for irregularities in the rim and lid, while still maintaining good sealing engagement, and which does not tend to suck down into the bucket even under such adverse mechanical conditions.

Prevention of inward displacement or sucking down of the gasket is a function primarily of the outer depending flange 21, and I have found that a very satisfactory improved gasket can be made without the inner or other depending portion, such a modified form being shown in Figure 5. In this case the gasket C' is preformed in the manner described heretofore and adapted to lie snugly against the inner surfaces of the annular portions 13' and 14' of the lid. The main body portion of the gasket has an outer depending flange portion 21', but the lower surface of the gasket extends in a plane from this flange. While the form shown and described earlier is my preferred form, the form of gasket shown in Figure 5 comprises a very considerable improvement over anything heretofore used in milkers.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. In a milker comprising a bucket having a large opening, closure means comprising a lid having an outer peripheral portion with a frusto-conical under surface and a depending flange at the outer edge thereof, said portion and flange forming a pocket; and an annular preformed gasket held in said pocket against said flange but being easily removable from said pocket, said gasket being elongated in cross-section and normally having a plane frusto-conical upper surface, said upper surface of the gasket when unrestricted and in normal preformed shape making a greater angle with the plane defined by the outer edge of the gasket than the angle between said frusto-conical under surface of the lid and the plane defined by the outer edge of said frusto-conical under surface so that the gasket is distorted and remains snugly in place in said pocket and against said frusto-conical under surface when the lid is removed from the bucket.

2. In a milker comprising a bucket having a large opening, closure means comprising a lid having an outer peripheral portion with an under surface sloping generally upwardly and inwardly and a depending flange at the outer edge thereof, said portion and flange forming a pocket; and an annular preformed gasket held in said pocket, said gasket being elongated in cross-section and having an upper surface with the same general configuration as the under surface of said peripheral portion, said upper surface of the gasket when unrestricted and in normal preformed shape making a greater angle with the plane defined by the outer edge of the gasket than the angle made by said under surface of the lid so that the gasket remains snugly in place in said pocket when the lid is removed from the bucket.

HENRY B. BABSON.

REFERENCES CITED

The following references are of record in the file of this patent:

UNITED STATES PATENTS

| Number | Name | Date |
|---|---|---|
| 259,862 | Irvin | June 20, 1882 |
| 293,912 | Reynolds | Feb. 19, 1884 |
| 709,491 | Kennedy | Sept. 23, 1902 |
| 1,356,085 | Ottem | Oct. 19, 1920 |
| 1,653,756 | Babson | Dec. 27, 1927 |
| 2,399,115 | Hansen et al. | Apr. 23, 1946 |

FOREIGN PATENTS

| Number | Country | Date |
|---|---|---|
| 236,323 | Great Britain | July 9, 1925 |
| 807,850 | France | Oct. 26, 1936 |